United States Patent

[11] 3,628,756

[72] Inventor Richard M. Johnson
 Dallas, Tex.
[21] Appl. No. 16,866
[22] Filed Mar. 5, 1970
[45] Patented Dec. 21, 1971
[73] Assignee LTV Electrosystems, Inc.
 Greenville, Tex.

[54] AIRFOIL MEMBER
 14 Claims, 5 Drawing Figs.

[52] U.S. Cl............................................. 244/42 C
[51] Int. Cl............................................. B64c 9/14
[50] Field of Search................................. 244/42 R,
 42 B, 42 D, 42 DA, 42 DB, 42 CB, 40, 41, 43, 113,
 42 C

[56] References Cited
 UNITED STATES PATENTS
2,418,273 4/1947 Moore.......................... 244/42
2,730,313 1/1956 Ringham...................... 244/42

Primary Examiner—Milton Buchler
Assistant Examiner—Carl A. Rutledge
Attorneys—Richards, Harris and Hubbard and James D. Willborn ABSTRACT: A disturbance of the airstream around an airfoil is created by extending a plurality of curved, elongated segments from a stacked position into the airstream. When in a stacked position, the curved segments present a contour that matches that of the airfoil to which they are pivoted. Each of the individual segments is restrained from being extended from a stacked position until the preceding segment has nearly reached its fully extended position. The curvature and pivot location of each segment is such that the force produced by an airflow impinging thereon will tend to move the segment into an extended position.

PATENTED DEC 21 1971

INVENTOR:
RICHARD M. JOHNSON

Richards, Harris & Hubbard
ATTORNEYS

INVENTOR:
RICHARD M. JOHNSON

AIRFOIL MEMBER

This invention relates to an airfoil member, and more particularly to an airfoil member that may be extended into an airstream for an effective distance greater than the stored dimensions of the member.

It was early recognized that by creating a disturbance in the airstream around an airfoil that the lift forces could be altered. The most common configuration of a member for disturbing the airstream of an airfoil is a slablike surface. As the name implies, a slab surface is nothing more than a flat plate. This plate is hinged at the leading edge and a power cylinder rotates the slab about the hinge point into the airstream. The force required to extend the slab surface into an effective position is a function of the height of the surface, its width, and the force created by the airflow. For high-speed aircraft, this force may become intolerably large and requires very large power actuators.

With the advent of thin-wing aircraft construction, the amount of space available for mounting the power cylinder to lift a slab surface has become restrictive. It now appears that aircraft design has reached the state where there may be insufficient space available within the wing to mount large power actuators for lifting slab surface disturbing members.

To overcome the problem of available space for large power actuators and the requirement of large airfoil members for disturbing the airstream of high-speed aircraft, various shaped structures have been designed to assist the power actuator in extending an aerodynamic member into an airstream. One of the early attempts to provide a self-extending aerodynamic member is disclosed in the U.S. PAt. No. 2,383,102 issued to E. F. Zap.

An object of the present invention is to provide a greater effective area extended into an airstream for a given power actuator size. A further object of this invention is to provide an aerodynamic member for disturbing the airstream that includes self-extending segments. Another object of this invention is to provide an aerodynamic member for extending into an airstream having an effective area greater than the storage area required for the member. A still further object of this invention is to provide a multiple-segment aerodynamic member for extending into an airstream. Still another object of this invention is to provide a multiple-segment aerodynamic member for extension into an airstream wherein the segments are sequentially extended.

In accordance with one embodiment of this invention, the apparatus for disturbing the airstream around an airfoil includes a plurality of curved, elongated segments pivoted to the airfoil and sequentially extended from a stacked position into an airflow. Means are provided for controlling the sequential order of extending the curved segments from a stacked position into the airstream. To extend the curved segments into the airstream and retract them into a stacked position, a power actuator is coupled to the airfoil and at least one of the individual segments.

In accordance with another embodiment of the invention, apparatus for disturbing the airstream around an airfoil includes a first curved, elongated segment having a pair of arms extending therefrom in the direction of the center of curvature of the segment for pivotally mounting to the airfoil. This first curved segment includes a slab surface mounted thereto that conforms to the outline of the airfoil surface. A second curved, elongated segment having a pair of arms extending therefrom in the direction of the center of curvature of the segment is pivotally mounted by means of the extending arms to the arms of the first segment. The second segment is stacked with the first segment in a retracted position and is sequentially extended after the first segment into the airstream by means of a power device.

A more complete understanding of the invention and its advantages will be apparent from the specifications and claims and from the accompanying drawings illustrative of the invention.

Referring to the drawings.

Although the invention will be described with reference to a wing spoiler, it should be understood that is it equally applicable to tail spoilers. Further, the invention is applicable to be used as other aerodynamic members such as flaps, ailerons, airbrakes and the like for controlling aircraft in flight.

Figure 1:
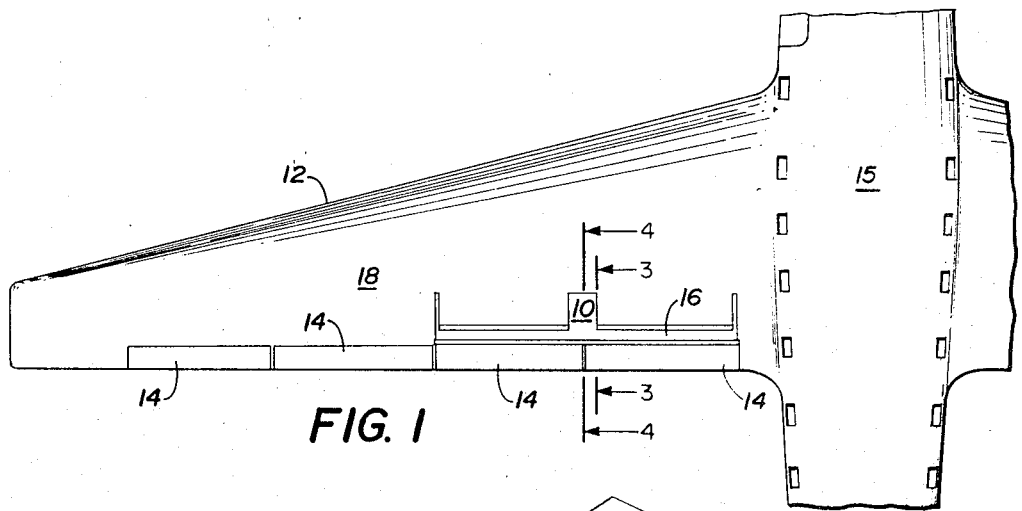
FIG. 1 is a top view of an aircraft wing section showing the airstream disturbing member (a wing spoiler) of the present invention in a retracted position.

Referring to FIG. 1, a spoiler generally designated by the numeral 10 is mounted within a recess of a wing 12 of an aircraft 15 in an area ahead of ailerons or flaps 14. In the retracted or stowed position the upper slab surface 16 of the spoiler forms a smooth continuation of the upper skin 18 of the wing 12. When in the stowed position, the slab surface 16 forms a part of the wing 12 and contributes to the lift produced thereby. An airstream thus moves past the wing 12 in a smooth undisturbed pattern.

To maneuver the aircraft around its longitudinal axis, ailerons on one side of the aircraft are rotated up in combination with the spoilers, as ailerons on the other side of the aircraft go down. For a change in altitude or to decrease the speed of an aircraft, spoilers on both sides of the aircraft (only one side shown) are extended into the smooth airstream around the wing thereby creating a disturbance and altering the lift thereof.

Figure 2:
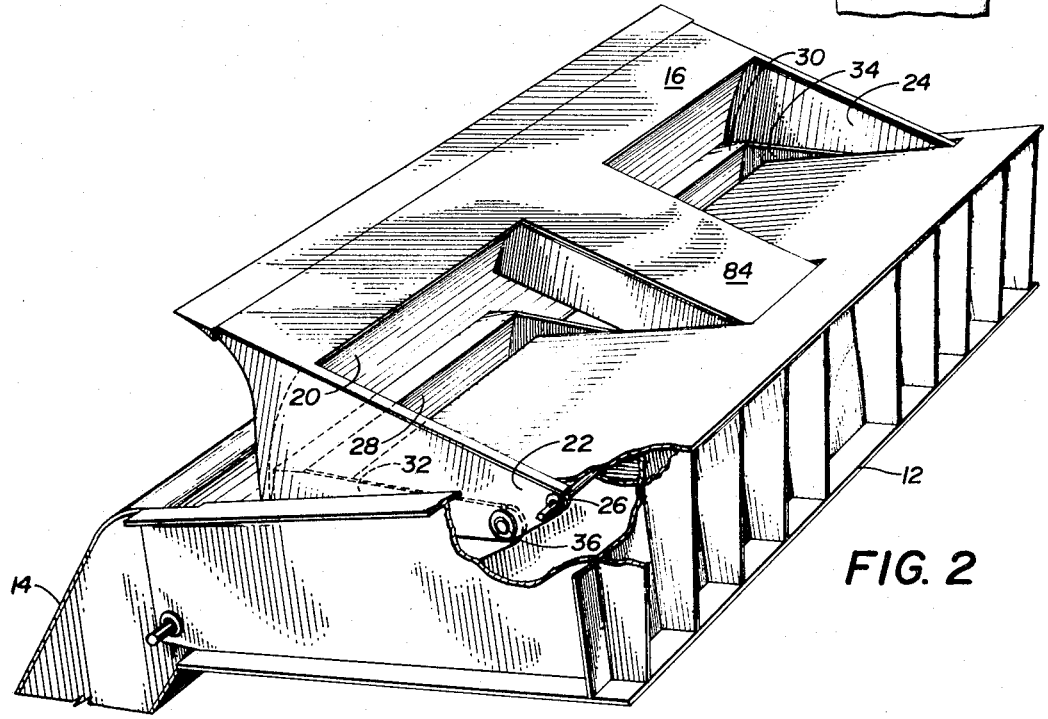
FIG. 2 is a perspective of a wing section illustrating a wing spoiler partially extended into the airstream.

Referring to FIG. 2, there is shown a section of the wing 12 with the spoiler 10 partially extended into the airstream. As illustrated, the spoiler includes a first curved, elongated segment 20 having the slab surface 16 mounted to the upper edge thereof. Arms 22 and 24 extend from the sides of the segment 20 in the direction of the center of curvature of the segment. These arms provide a means for pivotally connecting the segments 20 to the wing structure. With reference to the arm 22, the segment 20 is pivoted to rotate about a bearing shaft 26. A similar bearing shaft (not shown) is provided for the arm 24 for pivotally connecting the far side of the segment 20 to the wing structure.

A similar construction is provided for a curved, elongated segment 28 that is also extendable to the airstream above the wing 12. Curved segment 28 includes a narrow slab surface 30 at the upper end thereof to provide a smooth continuous surface to the wing 12 when the spoiler is fully retracted as illustrated in FIG. 1. Arms 32 and 34 extend from either end of the segment 28 in the direction of the center of curvature of the segment. These arms provide a means for pivotally mounting the segment 28 to the segment 20. With reference to the arm 32, a bearing 36 provides a pivotal mount for the segment 28 to the segment 20. A similar bearing (not shown) for the arm 34 provides a pivotal mount to the arm 24.

Figure 3:
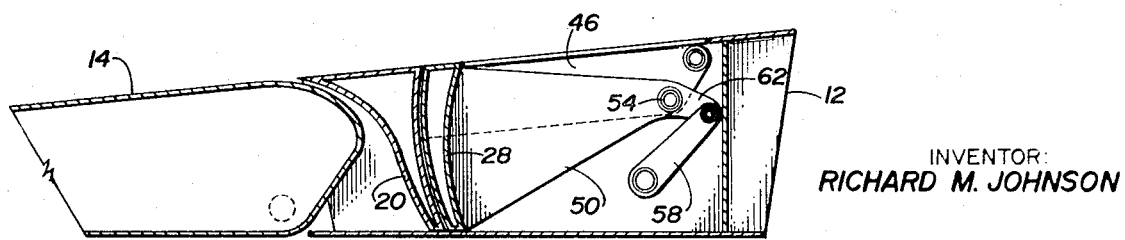
FIG. 3 is a side view of a two segment wing spoiler taken along the line 3—3 of FIG. 1.
Figure 4:
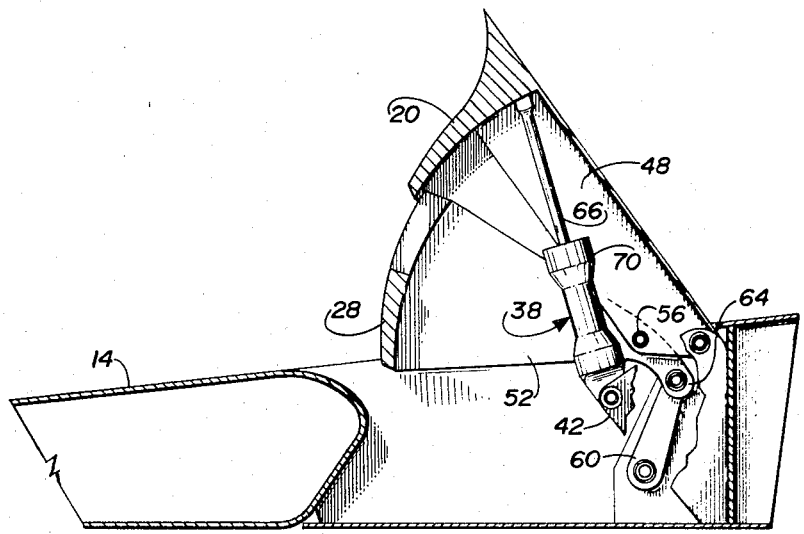
FIG. 4 is a cross section of a two segment wing spoiler taken along the line 4—4 of FIG. 1 and illustrating the power mechanism and sequence controlling linkages.

Referring to FIG. 3, there is shown in section the spoiler 10 with the segments 20 and 28 in a stacked position fully retracted within the wing 12. In FIG. 4, another section of the spoiler 10 is illustrated with the segments 20 and 28 in the fully extended position.

Referring to FIGS. 3 and 4, arms 46 and 48 are provided for additional pivots for connecting the segment 20 to the wing structure. Arms 50 and 52 provide additional pivotal support for the segment 28. Arms 50 and 52 are pivoted to arms 46 and 48 by means of bearings 54 and 56, respectively. To control the sequential operation of the segment 28 with respect to the segment 20, hinge links 58 and 60 are rotatably coupled to the wing structure and to extensions 62 and 64 of the arms 50 and 52, respectively.

To extend the spoiler 10 from the stacked position as shown in FIG. 3 to a position above the wing 12, a power actuator 38 connects to the segment 20 and bracket 42 of the wing structure. As the piston rod 66 moves out of the cylinder 70 by application of fluid pressure thereto, the segment 20 is rotated about the pivot point of the arms 22, 24, 46, and 48 in a clockwise motion. As the segment 20 extends above the wing 12 from the stacked position as illustrated in FIG 3 to the extended position as illustrated in FIG. 2, the pivot points of the segment 28 to the segment 20 rotate in an arc about the pivots of the segment 20 to the wing structure. The segment 28, however, remains in the stacked position by a counterclockwise-acting force moment produced by the links 58 and 60. This counteracting force moment continues to hold the segment 28 in the stacked position until the segment 20 has been fully extended.

At the point where the segment 20 has been extended as illustrated in FIG. 2, the pivot points of the segment 28 are rotated to a position such that the links 58 and 60 no longer hold this segment into the stacked position. A continued extension of the segment 20 above the wing 12 causes the segment 28 to also be extended. Now, however, the links 58 and 60 maintain the proper space relationship between the segments 20 an 28 to present a continuous surface for disturbing the airstream around the wing 12. When more than two segments are required, each subsequent segment will be sequentially extended after the previous segment has been extended.

In accordance with an important feature of the present invention, the force requirements of the power actuator 38 is minimized by curving the segments 20 and 28 and by properly locating the pivots for each of the various sections.

Figure 5:
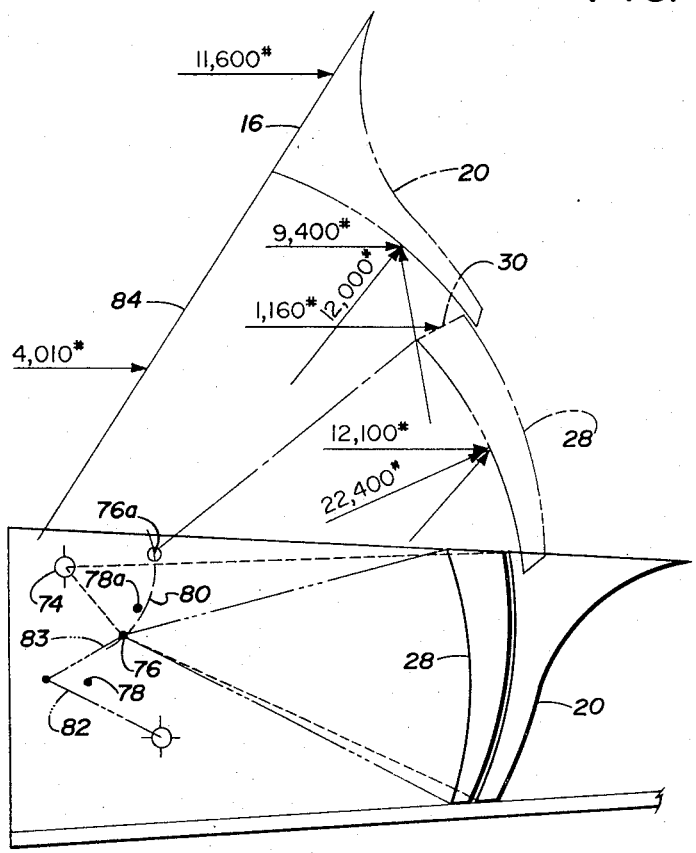
FIG. 5 is a force diagram of an airflow-disturbing member in accordance with the present invention.

Referring to FIG. 5, there is shown an outline diagram of the segments 20 and 28 and the pivot point for each of the segments with relation to its center of curvature. Segment 20 is pivoted to the wing 12 at a point 74 and has a center of curvature at a point 76 which in this example coincides with the pivot of the segment 28. Pivot point 76 is below the pivot point 74 and contained in the arm extending from the segment 20. With the center of curvature of the segment 20 below the pivot point 74, an airflow impinging on the segment produces a counterclockwise force moment which tends to cause the surface to move into the airstream. Similarly, the center of curvature for the segment 28 (point 78) is below the pivot point 76 for this segment. Again, since the center of curvature for the segment 28 is below the pivot point 76, an airflow impinging on the section causes it to be extended into the airstream above the wing 121. Thus, acting alone, the segments 20 and 28 have a tendency to float above the wing surface; however, the slab surfaces 16 and 30 cause a clockwise force moment about the pivot point 74 which holds the segments in a stacked position. Thus, by selecting the correct center of curvature and pivot locations along with the area of the slab surfaces 16 and 30, a net clockwise force moment will result about the pivot point 74 holding the spoiler in the stowed position. This net force is all that must be overcome by the actuator 38 to extend the spoiler fully into the airstream.

As the segment 20 is extended into the airstream, its center of curvature (pivot point 76), which is carried by arms supporting the segment 20, moves along the path 80 to a position 76a above the pivot point 74. The center of curvature (point 78) of the segment 28 moves along a path toward point 78a as this segment moves into a fully extended position. Note, this point is still below the pivot point 76 and the segment 28 has a tendency to be further extended; however, by operation of the links 82 and 83, further extension of the segment 28 is restricted. Although the center of curvature for the segment 28 is below the pivot point 74, the f force moment on the slab surfaces 16 and 30, the segment 20, and the segment 28, produces a clockwise moment about the pivot point 74 thereby requiring a net positive force by the power actuator 38 to maintain the spoiler in the extended position.

As an example and for a comparison, a slab surface spoiler has a hinge moment of 495,000 inch/pounds which must be produced by power actuators to extend the slab into an airflow. For a rectangular slab surface spoiler having a width of 100 inches and a height of 31 inches and rotated into the airstream 60°, a force of 1,380 pounds per projected inch (for a 100-inch spoiler) is produced. Using this value for a comparison example, assume a projected height for the slab surface 16 of 8.4 inches, then for a 100-inch span the total force exerted on the slab surface when in a fully extended position equals 11,600 pounds. The effective projected area is equal to the width of the slab surface 16 times the sine of the angle to which the surface is rotated. If the effective radius of the 11,600-pound force about the pivot point 74 equals 22.6 inches, then the moment reflected at the pivot equals 262,000 inch/pounds clockwise; that is, (11,600 pounds)×(22.6 inches)=262,000 inch/pounds. In the position illustrated in FIG. 5, assume the projection of the segment 20 has a height equal to 6.8 inches, then the force exerted on this segment equals 9,400 pounds; that is, (6.8 inches)×(1,380 pounds)=9,400 pounds. This resolves into a 12,000-pound force toward the center of curvature 76a, which, as explained, designates the extended position of the pivot point 76. If this force vector is applied on a 2.76-inch radius about the pivot point 74, then the moment reflected to the pivot point 74 equals 33,100 inch/pounds, counterclockwise; that is, (12,000 pounds) ×(2.76 inches) =33,100 inch/pounds. Because of the particular construction of the segment 20, the power actuator 38 will wipe out about 18 inches of the total 100-inch span of the segment 20. The above 33,100-inch/pound moment will, therefore, be only 82 percent of the figure given such that the moment produced by the curved segment 20 equals 27,100 inch/pounds counterclockwise. The net moment of the segment 20 and the slab surface 16 about the pivot point 74 is then equal to 234,900 inch/pounds, clockwise.

Continuing with an example of a spoiler in accordance with the present invention, if the slab surface 30 of the segment 28 has a projected height of 0.84 inch, then the 1,380 pounds per projected inch force produces a 1,160-pound force on the slab surface 30. If the 1,160-pound force is applied at a 3.6-inch radius about the pivot point 74, a force moment reflected to the pivot 74 equals 4,176 inch/pounds, clockwise; that is, (1,160 pounds)×(3.6 inches)=4,176 inch/pounds clockwise. Again, this is only 82 percent effective or (4,176 pounds)×(0.82 percent)=3,424 inch/pounds, clockwise. Adding this to the previous net figure gives a new net of 238,324 inch/pounds, clockwise. If the forward face of the segment 28 has a projected height of 10.92 inches, then the resulting moment about the pivot point 74 equals 67,200 inch/pounds, counterclockwise; that is, (10.92 inches)×(1,380 pounds) ×(0.82 percent)=12,357 pounds, which resolves into a 22,400-pound force applied about a 3-inch arm, or (22,400 pounds)×(3 inch)=67,200 inch/pounds. This assumes a 3-inch moment arm about the pivot point 74. Again, combining this moment with the previously calculated net moment leaves a further corrected moment about the pivot point 74 of 171,000 inch/pounds, clockwise. Finally, if the slab surface 84 covering the actuator 38 has an 18-inch width and a projected height of 16.76 inches, then the moment produced by this surface about the pivot point 74 equals 4,060 inch/pounds, clockwise. This assumes a 9.6-inch moment arm about the pivot point 74. The final net result of the moments produced about the pivot point 74 equals 171,000 inch/pounds plus the 4,060-inch/pound moment produced by the slab surface 84 resulting resulting in a total moment of of 175,060 inch/pounds, clockwise; as compared to a 495,000-inch/pound moment produced about a hinge point for a slab surface spoiler. Accordingly, the segment spoiler of the present invention significantly reduces the power requirements for extending an aerodynamic member into the airstream about an airfoil. Note that the effective area of the segment spoiler of this example equals the effective area of a 31-inch high slab surface extended to an angle of 60° and the same control effect on an aircraft will be produced. It should be understood that the above calculations are given by way of example and not by way of limitation and are rounded off in many cases.

While only one embodiment of the invention, together with modifications thereof, has been described in detail herein and sown in the accompanying drawings, it will be evident that various further modifications are possible without departing from the scope of the invention.

What is claimed is:

1. An aerodynamic member extendable into the airstream around an airfoil comprising:
   a plurality of curved, elongated segments each having at least one pair of arms extending therefrom in the direction of the center of curvature of said segment,
   means for pivoting one of said segments at each of the pair of arms to said airfoil,
   means for pivoting each of said other elongated segments at each of the pair of arms to the arms of one other of said segments,
   means for extending said segments from a stacked position into the airstream around said airfoil and for retracting said segments into a stacked position, and
   means for controlling the sequence of extension of said segments into the airstream and from the airstream into the stacked position.

2. An aerodynamic member extendable into the airstream around an airfoil as set forth in claim 1 including a slab surface carried by one of said segments into the airstream around said airfoil.

3. An aerodynamic member extendable into the airstream around and airfoil as set forth in claim 1 wherein said curved segments are pivoted in the direction of the center of curvature of said segments to extend from a stacked position by a force developed by an airflow impinging thereon.

4. An aerodynamic member extendable into the airstream around an airfoil as set forth in claim 1 wherein said segments are pivoted to each other with the first segment to be extended pivoted to the airfoil and each subsequently extended segment pivoted to the previously extending segment.

5. An aerodynamic member extendable into the airstream around an airfoil as set forth in claim 1 wherein the means for controlling the sequence of extending said curved segments includes means for holding all the unextended segments in a stacked position until the previously segment has been fully extended.

6. An aerodynamic member extendable into the airstream around an airfoil, comprising:
   a first curved, elongated segment having at least one pair of arms extending therefrom in the direction of the center of curvature of said segment,
   means for pivoting said segment at each of the pair of arms to said airfoil,
   a second curved, elongated segment having at least one pair of arms extending therefrom in the direction of the center of curvature of said segment,
   means for pivoting said segment at each of the pair of arms to the arms of said first segment,
   means for extending said segments from a stacked position into the airstream around said airfoil and for retracting said segments into a stacked position, and
   means for controlling the sequence of extension of said segments into the airstream and from the airstream into the stacked position.

7. An aerodynamic member extendable into the airstream around an airfoil as set forth in claim 6 wherein said means for controlling the sequence of extension of said segments includes a linkage pivoted to the airfoil and said second curved segment.

8. An aerodynamic member extendable into the airstream around an airfoil as set forth in claim 7 including a slab surface carried by the first of said segments into the airstream around said airfoil.

9. An aerodynamic member extendable into the airstream around an airfoil as set forth in claim 8 wherein said first and second curved segments are pivoted to be extended from a stacked position into the airstream by the force developed by an airflow impinging thereon.

10. An aerodynamic member extendable into the airstream around an airfoil as set forth in claim 9 wherein said means for extending said segments includes a power actuator pivotally connected to the airfoil and to said first segment.

11. An aerodynamic member extendable into the airstream around an airfoil, comprising:
   a first curved, elongated segment having at least one pair of arms extending therefrom in the direction of the center of curvature of said segment for pivotally mounting to the airfoil, and including a slab surface that conforms to the surface outline of the airfoil,
   A second curved, elongated segment having at least one pair of arms extending therefrom in the direction of the center of curvature of said segment for pivotally mounting to the arms of said first segment, and
   means for extending said segments from a stacked position into the airstream around said airfoil and for retracting said segments into a stacked position.

12. An aerodynamic member extendable into the airstream around an airfoil as set forth in claim 11 wherein said means for extending said segments include means for controlling the sequential order of extending curved segments.

13. An aerodynamic member extendable into the airstream around an airfoil as set forth in claim 12 wherein said segments are pivoted to be extended from a stacked position into the airstream by a force developed by an airflow impinging thereon.

14. An aerodynamic member extendable into the airstream around an airfoil as set forth in claim 13 wherein said means for extending said segments further includes means for holding the second segment into a stacked position until the first segment has been fully extended.

* * * * *